(Model.)

C. E. PATRIC.
FORCE FEED GRAIN DRILL.

No. 267,985.   Patented Nov. 21, 1882.

3 Sheets—Sheet 1.

Attest:
J. C. Turner
C. Clarence Poole

Inventor:
C. E. Patric
By his attorney
R. D. O. Smith (Model.)
3 Sheets—Sheet 2.
C. E. PATRIC.
FORCE FEED GRAIN DRILL.
No. 267,985. Patented Nov. 21, 1882.
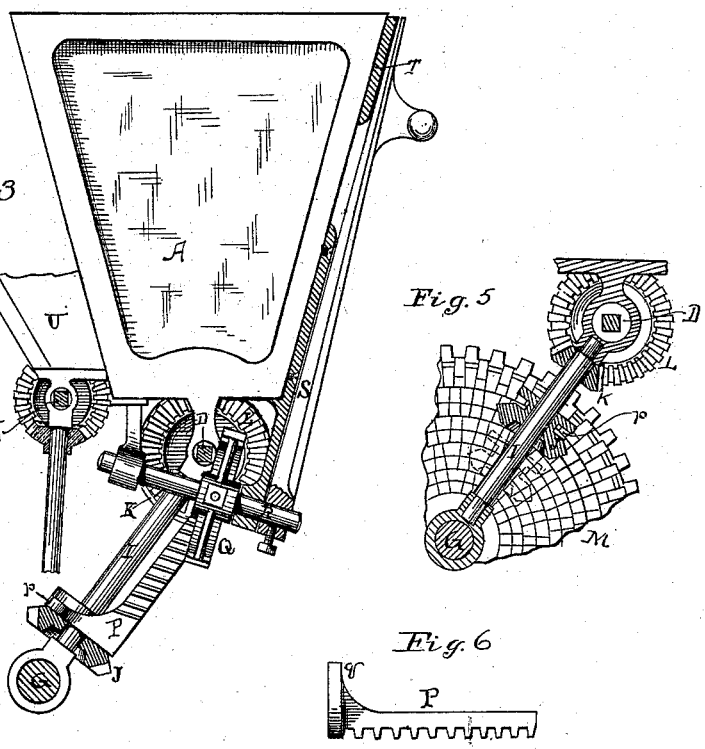
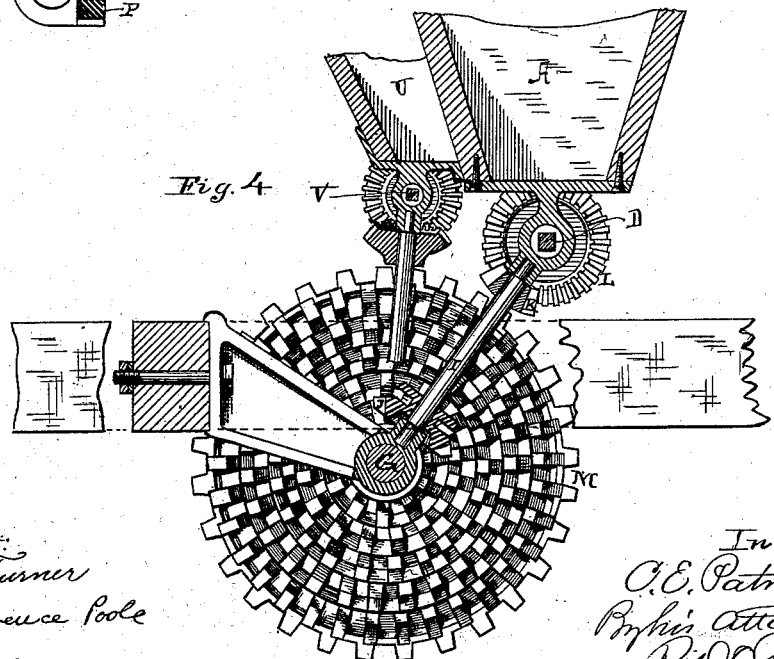

(Model.)

3 Sheets—Sheet 3.

C. E. PATRIC.
FORCE FEED GRAIN DRILL.

No. 267,985. Patented Nov. 21, 1882.

Attest:
J. C. Turner
C. Clarence Poole

Inventor:
C. E. Patric
By his atty R. D. O. Smith

N. PETERS, Photo-Lithographer, Washington, D. C.

UNITED STATES PATENT OFFICE.

CHARLES E. PATRIC, OF ROCHESTER, NEW YORK.

FORCE-FEED GRAIN-DRILL.

SPECIFICATION forming part of Letters Patent No. 267,985, dated November 21, 1882.

Application filed April 20, 1882. (Model.)

*To all whom it may concern:*

Be it known that I, CHARLES E. PATRIC, of Rochester, Monroe county, in the State of New York, have invented new and useful Improvements in Force-Feed Grain-Drills; and I do hereby declare that the following is a full and accurate description of the same.

The force-feed for grain-drills are constructed to deliver a certain quantity at each revolution, and therefore a change of speed will effect a corresponding change in rate of delivery. Various expedients have been resorted to to effect a change of speed, but so far as I know none of these expedients have possessed the requisite simplicity and reliability, nor can any of them, so far as I am aware, be operated to change the speed while the machine is in action.

My invention consists, first, in a device whereby the speed of the force-feed disks may be changed at will, and, second, in an automatic clutch-shifter whereby the force-feed mechanisms are thrown in or out of gear with the driving-wheel by the act of lowering or raising the hoes.

That others may fully understand my invention, I will particularly describe it, having reference to the accompanying drawings, wherein—

Figure 1:
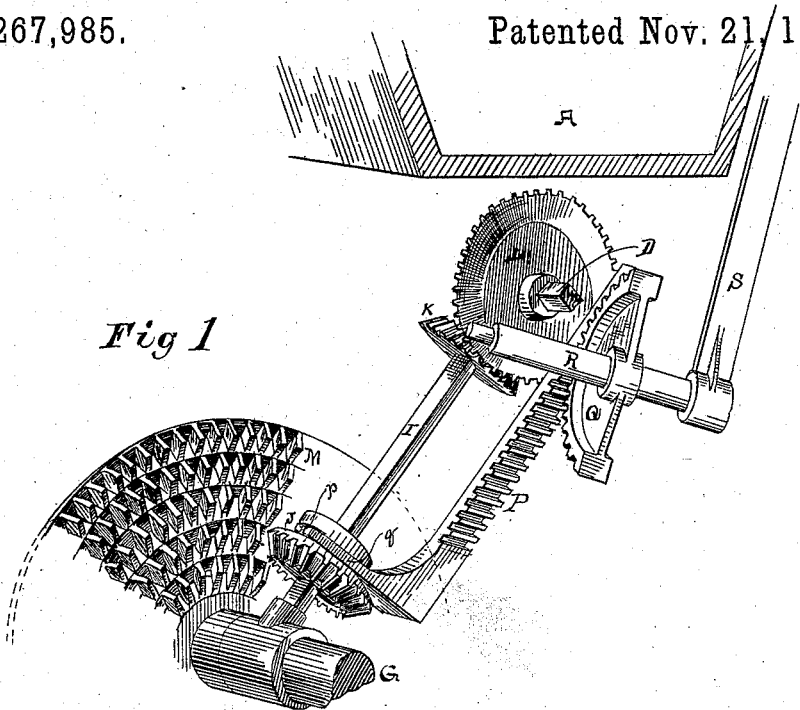
Figure 2:
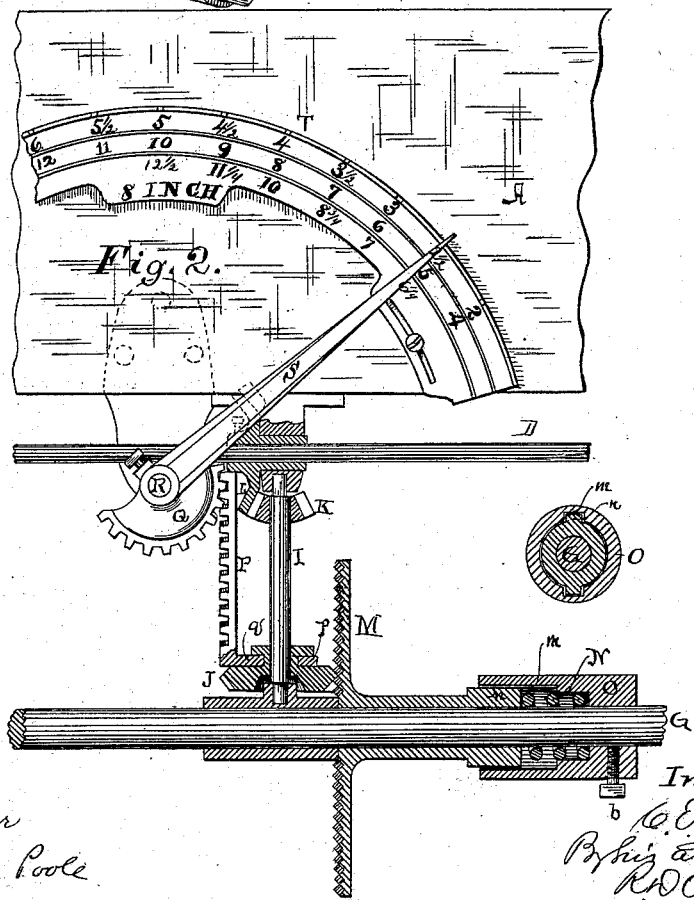
Figure 9:
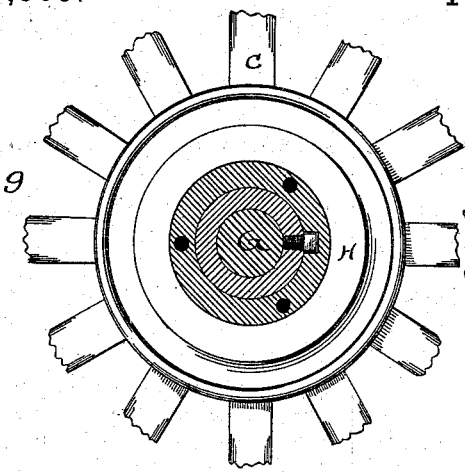
Figure 10:
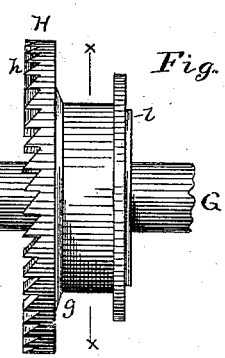
Figure 11:
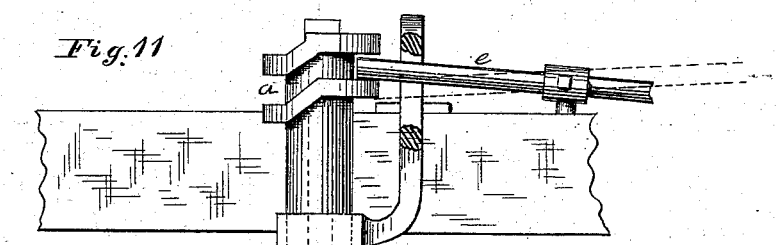
Figure 12:
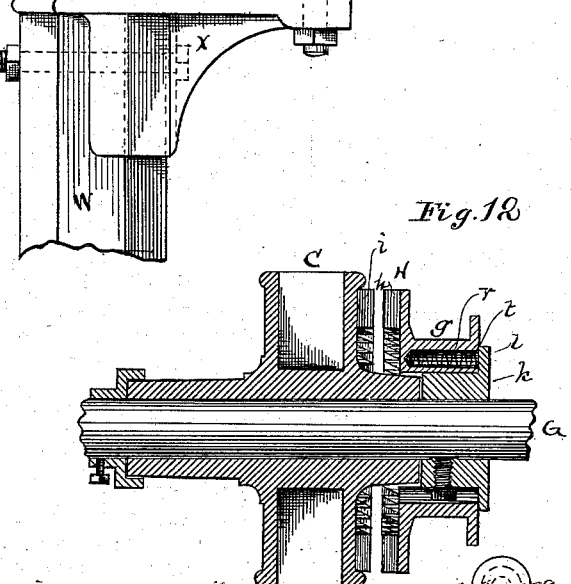
Figure 13:
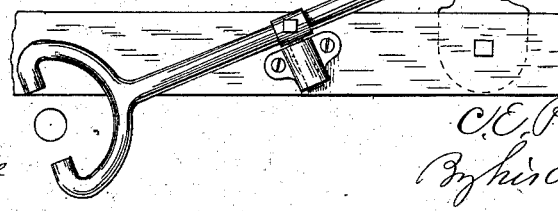

Figure 1 is a perspective of the operative parts in position. Fig. 2 is a rear elevation of the same. Figs. 3 and 4 are side elevations of the same. Figs 5, 6, 7, 8, are details. Fig. 9 is a transverse section through the ratchet-hub. Fig. 10 is a side elevation of the same. Fig. 11 is a plan of the cam which controls the shifting-lever. Fig. 12 is a longitudinal section of the hub. Fig. 13 is a side elevation of the shifting-lever.

A is the seed-hopper, mounted upon the usual frame and supported upon carrying-wheels. Beneath the hopper A there is a feed-shaft, D, supported in the seed-cups as usual. The seed-cups may be of any approved style, and deliver their grains into chutes and down to the hoes, as in other machines of this class.

The main axle G is provided with a ratchet-clutch, H, which engages with one of the wheels, C, when not forcibly withdrawn, so that when not in such engagement motion is communicated from such wheel to said axle. From the axle G motion is transmitted to the feed-shaft D by mechanism which forms the subject-matter of the first part of my invention. A bevel-wheel is placed upon the axle G, and from this motion is transmitted to the feed-shaft D by a short counter-shaft, I, and suitable bevel-pinions, J K L. It is apparent that the relative diameters of the operative pitch-lines of the pinions will determine the relative speed of the axles D and G, and that a variation of the diameters of said pitch-lines will cause a corresponding variation of speed.

The object of my invention is to place the desired variability of speed under immediate control of the attendant, so that it may be varied at will and without detaching or replacing any removable parts. To accomplish this result I make one of the train of gear with a variable pitch-line, so that its pinion may engage with it at one or another distance from its center, and I find it most convenient to locate this variable wheel on the main axles G, and therefore the disk-wheel M is placed thereon in mesh with the pinion J. The wheel M is in the form of a flat disk, and is provided on its face with concentric rows of angular teeth, each row having a pitch corresponding with the pitch of the teeth of the pinion J, so that said pinion-teeth will mesh with said disk-teeth at either of said concentric rows thereof, and therefore to secure a variation of speed it is only necessary to move said pinion J farther from or nearer to the axis of the axle G, and thereby cause it to engage with one or another of said rows of disk-teeth. To accomplish this easily I provide a spline and feather or other proper means for permitting the pinion J to move along the counter-shaft I without revolving upon it. The several rows of teeth of the disk-wheel M are necessarily separated by slight ridges, because the several teeth themselves are separated by cavities into which the teeth of the pinion J descend when in action. To pass from one concentric row of cavities to another it is necessary to pass over an intervening ridge, because as the several rows contain different numbers of teeth they will not be arranged on radial lines. In moving the pinion J from one row of disk-teeth to another it is therefore necessary that the disk or pinion should yield, and it is more convenient to arrange the disk M to slide upon the axle G and place a retracting-spring, N, behind it than to provide for a lateral movement of the shaft I and pinion J; and to avoid weakening the shaft G by spline or feather to prevent a separate revolution of the disk M, I arrange a hollow sleeve, O, to cover said spring and the end of the hub of the wheel M, and arrange a spline and feather, m n, therein. The sleeve O may be secured rigidly to the axle G by a set-screw, b, or otherwise, as most convenient or desirable.

The hub of the pinion J is provided with an annular groove, p, into which is placed a fork, q, which projects laterally from a rack, P, whereby the pinion J may be caused to slide along the counter-shaft I. The teeth of the rack P mesh with the teeth of a segment, Q, mounted upon the shaft R, upon which is also mounted the indicator hand or lever S, whereby the segment Q is rotated and the rack P and pinion J are moved up or down, as set forth. The indicator hand or lever S sweeps over a dial-plate, T, whereon is inscribed the various quantities of the different grains which will be discharged upon a given area with the parts of the properly-adjusted apparatus in the position indicated by the lever or hand S. It is necessary that the rack P shall move in a line parallel with the counter-shaft I, but this direction will not usually coincide with the inclination of the side of the seed-hopper against which it is convenient to place the dial T. I therefore mount the shaft R oblique to the direction of the axis of the shaft I and cut the teeth of the rack P askew or parallel with the axis of the shaft R. The teeth of said rack will then properly mesh with the segment Q, notwithstanding they do not move in parallel planes. The method and arrangement of devices for controlling and shifting the pinion J above described are, however, conveniences, and not necessities, because other well-known mechanical expedients may be employed to move said pinion. I do not therefore propose to confine my invention to those particular contrivances for giving it effect.

The grass-seed hopper U, which is commonly attached to one side of the grain-hopper A, is supplied with a separate set of force-feed cups, driven by a separate feed-shaft, V, and this shaft may be driven by an arrangement of adjustable devices which are duplicates of those above described for the purpose of driving and controlling the feed-shaft D, or the shaft V may be driven from the shaft D; but it is more desirable to have it separately driven and therefore separately and independently adjustable.

It is desirable that the act of raising the hoes from the ground shall also throw the feed mechanism out of gear, so that there will be no wasting of seed nor any failure to go into action promptly when the hoes enter the ground. The hoes are attached by chains to the usual eccentric lifting-bar W, which when rotated backward rises up and lifts all the hoes from the ground. This is effected by mounting said lifting-bar at its ends upon brackets, X, the extremities of which form journals and rest in suitable bearings on the rearward extensions of the frame. A lever serves to rotate the lifting-bar when desired. On the end of the journal-bracket X there is a cam-groove, a, in which the end of the clutch-lever e rests and is moved laterally when said bar is rotated. The clutch-lever is pivoted at a convenient point on the frame, and at its opposite end its fork rests in the groove g of the clutch H the ratchet-teeth h whereof engage with the similar teeth i on the hub c.

The sleeve of the clutch H may slide directly upon the axle, but I prefer to mount it on a hub, k, which is rigidly fastened to said axle. Said hub k is provided with a flange, l, which not only confines the clutch in place, but also covers the holes r in which the springs t are concealed to force the clutch into engagement when released by the clutch-lever.

Having described my invention, what I claim as new is—

1. In a seeding-machine, a driving-shaft, a feed-shaft, and a series of feed-wheels mounted thereon, combined with a train of connecting-gearing, one member of said train being a wheel the pitch-lines of engagement whereof may be varied as to diameter at will, whereby the speed transmitted is correspondingly varied, as set forth.

2. In a seeding-machine, a driving-shaft, a feed-shaft parallel to but independent of said driving-shaft, and a series of force-feed wheels mounted on said shaft, combined with a train of connecting mechanism one member whereof is a disk-wheel, M, provided with concentric rows of teeth of equal pitch and another member whereof is a pinion, J, adjustable to mesh with either row of teeth on said disk-wheel.

3. In a seeding-machine, a driving-shaft, a feed-shaft independent of but parallel thereto, and a series of force-feed wheels mounted on said feed-shaft, combined with a train of connecting mechanism one member whereof is a disk-wheel, M, provided with concentric rows of miter-teeth of equal pitch, and another member whereof is a pinion, J, adjustable to mesh with either row of teeth on said disk-wheel, and means whereby said pinion may be moved at will and retained in adjustment.

4. In a seeding-machine, a driving-shaft, a feed-shaft, and a series of feed-wheels mounted thereon, combined with a train of connecting mechanism one member whereof is a disk-wheel, M, provided with concentric rows of teeth of equal pitch, and another member whereof is a pinion, J, adjustable to mesh with either row of teeth on said disk-wheel, and the rack P, segment Q, and indicator S.

5. In a seeding-machine, a driving-shaft, a feed-shaft, and a series of feed-wheels mounted thereon, combined with a train of connecting mechanism one member whereof is a disk-wheel, M, provided with concentric rows of teeth of equal pitch, and another member whereof is a pinion, J, adjustable to mesh with either row of teeth on said disk-wheels, and a rack, P, with skew-teeth, the segment Q on shaft R, oblique to the axis of motion of said rack, and the indicator T.

6. The wheel C, provided with the ratchet-hub $i$, and the sliding ratchet-clutch H, provided with holes $r$ and their inclosed springs $t$, combined with the hub $k$, rigidly secured to the shaft and provided with flange $l$, substantially as set forth.

7. The wheel C, provided with the ratchet-hub $i$, and the sliding ratchet-clutch H, provided with the cells $r$ and their inclosed springs, combined with the hub $k$, rigidly secured to the shaft G and provided with flange $l$, substantially as set forth.

8. The pinion J, adjustable along its axis of revolution, combined with the disk M, provided with concentric rows of gear-teeth of equal pitch wherewith said pinion may mesh, and a traction-spring, N, behind said disk, whereby it may yield and spring back when said pinion passes from one of said rows of teeth to another.

9. The disk M, mounted upon the shaft G, combined with the hollow hub O, fixed upon said shaft, the inclosed spline and feather, whereby said disk is compiled to turn with said shaft, and the inclosed spring N, whereby said disk may be permitted to move lengthwise of said shaft.

10. A disk-wheel, M, provided with concentric rows of cog-teeth of equal pitch, combined with a pinion, J, adjustable along its axis of rotation so as to be capable of meshing with either one of said rows of gear-teeth, and an elastic member whereby said disk and pinion may be permitted to recede and approach each other when passing from one concentric series to another.

CHARLES E. PATRIC.

Witnesses:
E. W. STEPHENS,
G. W. TEW.